United States Patent
Choi et al.

(10) Patent No.: US 12,088,703 B2
(45) Date of Patent: Sep. 10, 2024

(54) METHOD AND APPARATUS FOR CONTROL ACTION BASED ON SOFTWARE DEFINED NETWORKING ASSOCIATED WITH QUANTUM KEY DISTRIBUTION NETWORK MANAGEMENT IN QUANTUM KEY DISTRIBUTION NETWORK

(71) Applicant: ELECTRONICS AND TELECOMMUNICATIONS RESEARCH INSTITUTE, Daejeon (KR)

(72) Inventors: Tae Sang Choi, Daejeon (KR); Jeong Yun Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 57 days.

(21) Appl. No.: 17/535,864

(22) Filed: Nov. 26, 2021

(65) Prior Publication Data

US 2022/0360434 A1    Nov. 10, 2022

(30) Foreign Application Priority Data

May 10, 2021  (KR) .................. 10-2021-0059934
Nov. 8, 2021  (KR) .................. 10-2021-0152528

(51) Int. Cl.
*H04L 9/08*    (2006.01)
*H04L 67/10*   (2022.01)

(52) U.S. Cl.
CPC ............ *H04L 9/0852* (2013.01); *H04L 67/10* (2013.01)

(58) Field of Classification Search
CPC ........ H04L 9/0852; H04L 67/10; H04L 41/40
See application file for complete search history.

(56) References Cited

U.S. PATENT DOCUMENTS

| 10,958,428 B2 | 3/2021 | Hong et al. |
| 2017/0338952 A1 | 11/2017 | Hong et al. |
| 2022/0173896 A1* | 6/2022 | Rahman ................. H04L 41/12 |

FOREIGN PATENT DOCUMENTS

| KR | 10-2019-0073520 A | 6/2019 |
| KR | 10-2021-0081178 A | 7/2021 |

OTHER PUBLICATIONS

Quantum key distribution networks—Control and management, ITU-T Y.3804, Sep. 2020 (Year: 2020).*

(Continued)

*Primary Examiner* — Robert B Leung
(74) *Attorney, Agent, or Firm* — Rabin & Berdo, P.C.

(57) ABSTRACT

The present disclosure relates to a method and apparatus for control action based on software-defined networking associated with quantum key distribution network (QKDN) management in a quantum key distribution network. A method for performing a control action associated with QKDN management in a QKDN according to an embodiment of the present disclosure may include: receiving, by a first control entity, control action information from a QKDN manager; determining, by the first control entity, a target of the control action based on the control action information; classifying, by the first control entity, the control action sequentially as one of a routing or rerouting-related control action, a provisioning-related control action, a protection or recovery-related control action, and a charge-related control action based on the target of the control action; and transmitting, by the first control entity, information for performing the control action for a target associated with the classified control action.

10 Claims, 3 Drawing Sheets

(56) References Cited

OTHER PUBLICATIONS

Draft Recommendation ITU-T Y. QKDN_SNDC: "Quantum Key Distribution Networks—Software Defined Networking Control", SG13-TD550/WP3, Mar. 2021 (Year: 2021).*

H. Wang et al. Quantum-Key-Distribution (QKD) Networks Enabled by Software-Defined Networks (SDN). Applied Sciences 2019, 9, 2081; doi: 10.3390/app9102081. Published May 2019. (Year: 2019).*

Y. Cao et al. SDQaaS: software defined networking for quantum key distribution as a service. Optics Express 6892, vol. 27, No. 5; doi: 10.1364/OE.273006892. Published Feb. 2019. (Year: 2019).*

Functional requirements for quantum key distribution networks. ITU-T Y.3801. Apr. 2020. (Year: 2020).*

Y. Zhao, Z. Ma, H. Wang, X. Yu and J. Zhang, "Software Defined Quantum Key Distribution Networks," 2019 Asia Communications and Photonics Conference (ACP), Chengdu, China, 2019, pp. 1-3. (Year: 2019).*

A. Aguado, V. López, J. P. Brito, A. Pastor, D. R. López and V. Martin, "Enabling Quantum Key Distribution Networks via Software-Defined Networking," 2020 International Conference on Optical Network Design and Modeling (ONDM), Barcelona, Spain, 2020, pp. 1-5, doi: 10.23919/ONDM48393.2020.9133024. (Year: 2020).*

W. Yu, B. Zhao and Z. Yan, "Software defined quantum key distribution network," 2017 3rd IEEE International Conference on Computer and Communications (ICCC), Chengdu, China, 2017, pp. 1293-1297, doi: 10.1109/CompComm.2017.8322751. (Year: 2017).*

* cited by examiner

METHOD AND APPARATUS FOR CONTROL ACTION BASED ON SOFTWARE DEFINED NETWORKING ASSOCIATED WITH QUANTUM KEY DISTRIBUTION NETWORK MANAGEMENT IN QUANTUM KEY DISTRIBUTION NETWORK

CROSS REFERENCE TO RELATED APPLICATION

The present application claims priority to a K.R. application 10-2021-0059934, filed May 10, 2021, and a K.R. application 10-2021-0152528, filed Nov. 8, 2021, the entire contents of which are incorporated herein for all purposes by this reference.

BACKGROUND OF THE INVENTION

Field of the Invention

The present disclosure relates to software-defined networking in a quantum key distribution network and, more particularly, to a method and apparatus for control action based on software-defined networking associated with quantum key distribution network management in a quantum key distribution network.

Description of the Related Art

Quantum key distribution (QKD) is a technology of distributing and sharing quantum keys between remote users based on quantum physics. This technology is capable of preventing an attacker from wiretapping and of enabling a sender and a receiver to share a quantum key. For example, QKD may be defined as a procedure or method of creating and distributing a symmetric encryption key with information-theoretic security based on quantum information theory.

Quantum key distribution network (QKDN) is a technology of applying a QKD cryptosystem to a general communication network. For example, QKDN may be defined as a network including 2 or more QKD nodes which are connected through QKD links. QKDN may support key sharing through key relay for QKD nodes that are not directly connected by a QKD link. Specifically, as a QKD system operates only on a point-to-point link, the link distance is fundamentally limited by photon loss, while QKDN may support network redundancy for stable operation and provide communication based on quantum key encryption to remote users through key relay and rerouting.

For the control based on software-defined networking (SDN) in QKDN, the recent discussions cover such issues as requirements, functional structures, reference points, hierarchical SDN controller, an overall operating procedure, controllable elements, security considerations and the like. SDN may be defined as a set of techniques of enabling direct programming, orchestration, control and management of network resources and may design, deliver and operate a network service in a dynamic and scalable manner.

However, no concrete scheme has been provided for control action based on SDN control associated with QKDN management in QKDN.

SUMMARY

The present disclosure is technically directed to provide a new operation procedure of SDN control in QKDN.

The present disclosure is further technically directed to provide a new method and apparatus for control action based on SDN control associated with QKDN management in QKDN.

The technical objects of the present disclosure are not limited to the above-mentioned technical objects, and other technical objects that are not mentioned will be clearly understood by those skilled in the art through the following descriptions.

A method for performing a control action associated with quantum key distribution network (QKDN) management in a QKDN according to an aspect of the present disclosure may include: receiving, by a first control entity, control action information from a QKDN manager; determining, by the first control entity, a target of the control action based on the control action information; classifying, by the first control entity, the control action sequentially as one of a routing or rerouting-related control action, a provisioning-related control action, a protection or recovery-related control action, and a charge-related control action based on the target of the control action; and transmitting, by the first control entity, information for performing the control action for a target associated with the classified control action.

A controller for performing a control action associated with quantum key distribution network (QKDN) management in a QKDN according to another aspect of the present disclosure may include N control entities (N is an integer equal to or greater than 1), wherein a first control entity may include: a control action information transceiver configured to receive control action information from a QKDN manager; and a control action management unit configured to determine a target of the control action based on the control action information and to classify, based on the target of the control action, the control action sequentially as one of a routing or rerouting-related control action, a provisioning-related control action, a protection or recovery-related control action and a charge-related control action. Herein, for a target associated with the control action classified by the control action management unit, the control action information transceiver may be set to transmit information for performing the control action.

According to the present disclosure, as a new operation procedure of SDN control in QKDN is provided, new and efficient SDN-based control, which satisfies control requirements of QKDN, may be provided through a centralized control model, separation of control plane and forward plane and an open interface for applications.

Also, according to the present disclosure, as a new method and apparatus for control action based on SDN control associated with QKDN management in a QKDN is provided, it is possible to efficiently perform various control actions such as rerouting, protection/recovery and charging, which are associated with entities constituting the QKDN.

Effects obtained in the present disclosure are not limited to the above-mentioned effects, and other effects not mentioned above may be clearly understood by those skilled in the art from the following description.

DETAILED DESCRIPTION

Figure 1:
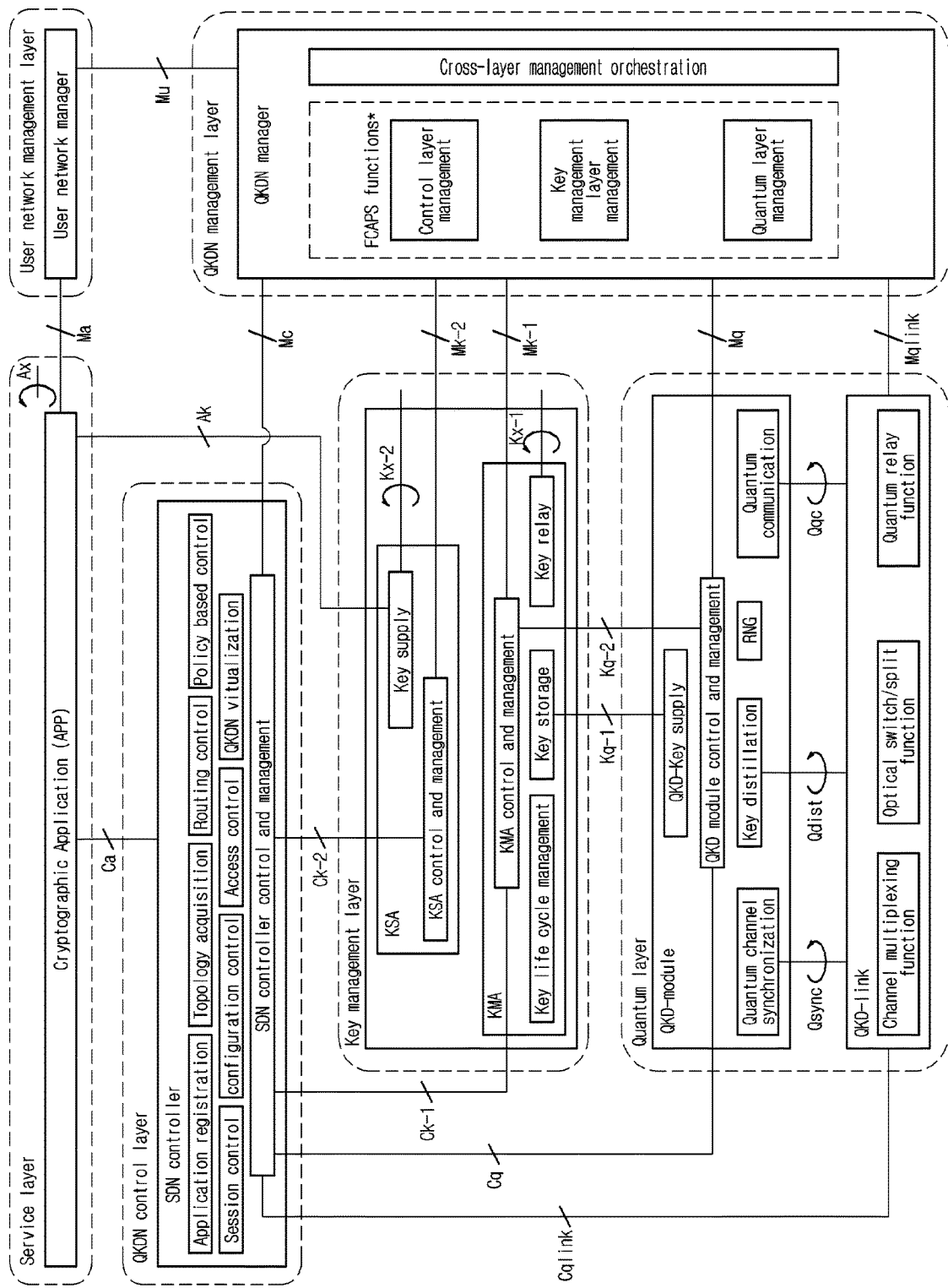
FIG. 1 is a view illustrating a functional structure of SDN control in a QKDN to which the present disclosure is applicable.

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the following description of the embodiments of the present disclosure, a detailed description of known configurations or functions incorporated herein will be omitted when it may make the subject matter of the present disclosure rather unclear. In addition, parts not related to the description of the present disclosure in the drawings are omitted, and like parts are denoted by similar reference numerals.

In the present disclosure, when a component is referred to as being "linked", "coupled", or "connected" to another component, it is understood that not only a direct connection relationship but also an indirect connection relationship through an intermediate component may also be included. In addition, the term "comprise" or "have" in the present disclosure specifies the presence of a feature, a step, an operation, an element and/or a component mentioned herein but does not exclude the presence or addition of one or more additional features, steps, operations, elements, components and/or a combination thereof.

In the present disclosure, the terms "first" "second" and the like are used only to distinguish one component from another not to restrict components and do not limit the order or importance of components, etc. unless specifically stated otherwise. Accordingly, within the scope of the present disclosure, a first component in one embodiment may be referred to as a second component in another embodiment, and similarly a second component in one embodiment may be referred to as a first component in another embodiment.

In the present disclosure, components that are distinguished from each other are intended to clearly illustrate respective features. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

The various embodiments of the disclosure are not intended to list all the possible combinations of components but are intended to illustrate representative aspects of the disclosure, and some or all the components described in the various embodiments may be applied independently or in a combination of two or more. That is, the components described in the various embodiments of the present disclosure are not necessarily essential components, and some may be optional components. Accordingly, embodiments consisting of a subset of the components described in one embodiment are also included within the scope of the present disclosure. Also, an embodiment that includes other components in addition to the components described in the various embodiments is also included in the scope of the present disclosure.

Although the exemplary methods of the present disclosure are represented by a series of acts for clarity of explanation, they are not intended to limit the order in which the steps are performed, and if necessary, each step may be performed simultaneously or in a different order. In addition, in order to implement a method according to the present disclosure, the illustrative steps may include an additional step or exclude some steps while including the remaining steps. Alternatively, some steps may be excluded while additional steps are included.

The terminology used herein is intended to describe particular embodiments but not to limit the claims. As used in the descriptions of embodiments and the appended claims, singular expressions are intended to include plural expressions unless clearly otherwise indicated by the context. In addition, in the present disclosure, the term "and/or" may refer to one of relevant items listed herein or may refer to and include any two or more possible combinations thereof. In addition, in the present disclosure, "I" has the same meaning as "and/or", unless stated otherwise.

FIG. 1 is a view illustrating a functional structure of SDN control in a QKDN to which the present disclosure is applicable.

FIG. 1 illustrates an example functional structure of SDN control based on a predefined structure of QKDN.

A QKDN structure may include various entities such as a quantum layer, key management (KM) layer, a QKDN control layer, a service layer and a QKDN management layer.

The functional elements of a quantum layer may include a QKD-link and a QKD-module and may be enabled to easily communicate with a SDN controller. The parameters of a QKD-link and a QKD-module such as a quantum key creation rate, transmission power and reception power may be adjusted by a SDN controller of a QKDN control layer.

As illustrated in FIG. 1, the functions of a QKD-link may include channel multiplexing, optical switch/separation, quantum relay and the like. The functions of a QKD-module may include quantum channel synchronization, key distillation, random number generation (RNG), quantum communication, QKD-key provision and the like.

The functional elements of a key management layer may include a key management agent (KMA) and a key supply agent (KSA) and may exchange a message for control and management with a SDN controller. The SDN technology enables a virtual quantum key pool (VQKP) to be configured in QKDN. Herein, the VQKP may be defined as a virtual QKD-key storage entity for any pair of quantum nodes and may improve quantum key management.

As illustrated in FIG. 1, the functions of a KMA may include key life management, key storage, key relay and the like. The function of a KSA may include key supply.

The functional element of a QKDN control layer may include a SDN controller. The SDN controller may control various resources for ensuring the security, safety, efficiency and robustness of QKDN operation. Unlike an existing QKDN controller, the SDN controller may have an interface with an upper layer like a service layer and a control layer. The SDN controller may enable fast service provisioning for an application of QKDN through an interface for a cryptographic application of a service layer.

As illustrated in FIG. 1, the functions of a SDN controller may include application registration, topology acquisition, routing control, policy-based on control, session control, setting control, access control, QKDN virtualization and the like.

As described below, a QKDN control layer may include N (N is an integer equal to or greater than 1) SDN control entities. When the QKDN control layer includes a plurality of SDN control entities, the plurality of SDN control entities may be distinguished by groups of resources (e.g., targets, regions, subnetworks, functions) which are controlled by respective entities. In addition, the plurality of SDN control entities may have a hierarchical structure with upper-lower relations. For example, a plurality of lower control entities may correspond to one upper control entity, or a plurality of lower control entities may be replaced by one upper control entity.

Hereinafter, when a QKDN control layer includes a plurality of SDN control entities, it is assumed that each SDN control entity controls a separate resource group. For example, a first control entity may be assigned to or control a first resource group, and a second control entity may be assigned to or control a second resource group. In addition, different resource groups may commonly include all or some resources. For example, the first resource group may include a common resource(s) with the second resource group, the first resource group may be configured as a subset of the second resource group, or the first resource group and the second resource group may not include any common resource.

A cryptographic application of a service layer may utilize a pair of shared keys, which are provided by a QKDN, and perform encoded communication between remote parties. A cryptographic application may be disclosed and provided by a SDN controller and through an interface with the SDN controller. Three representative cryptographic applications of a service layer are a point-to-point application, a point-to-multipoint application and a multipoint-to-multipoint application.

The elements of a QKDN management layer may obtain setting and management information through communication with a SDN controller. As illustrated in FIG. 1, the functions of a QKDN manager may include not only the functions of fault, configuration, accounting, performance and security (FACPS) but also control layer management, key management layer management, quantum layer management, and cross-layer management orchestration.

Information exchange between layers (or functional elements or entities) in the above-described QKDN structure may be performed through a logical interface between layers/functional elements/entities, which is defined as a reference point. For example, a reference point between a SDN controller of a QKDN control layer and a KM control and management function of a KM layer may be defined as a difference. Reference point Ck may take charge of communicating control information between the SDN controller and the KM control and management function. Specifically, a reference point between the QKDN control layer and a KMA control and management function may be defined as Ck-1, and a reference point between the QKDN control layer and a KSA control and management function may be defined as Ck-2.

Figure 2:
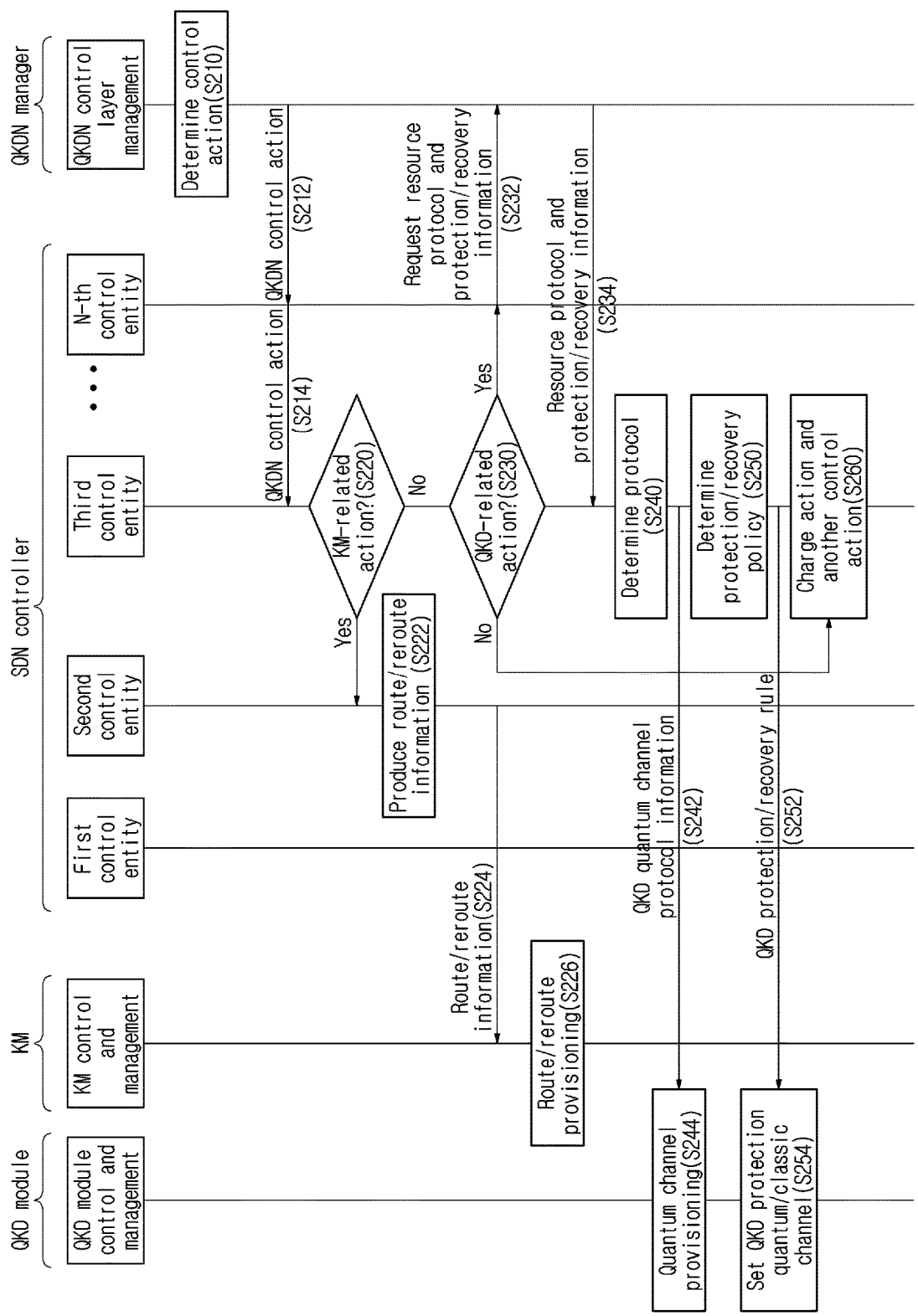
FIG. 2 is a view for explaining a control action procedure of a SDN controller associated with QKDN management according to an embodiment of the present disclosure.

FIG. 2 is a view for explaining a control action procedure of a SDN controller associated with QKDN management according to an embodiment of the present disclosure.

Most control actions for a QKDN, especially control actions requiring a real-time determination, may be handled by a SDN controller itself. However, some control actions may need the intervention of a QKDN management layer. For example, a control action procedure associated with QKDN management may include such examples as optimized routing path production including resource load balancing, QKD quantum channel provisioning for a case associated with multiple heterogeneous channel protocols, determination and provisioning of QKD quantum/classic channel protection/recovery policy, and charge-based control. This embodiment describes a concrete method for performing such a control action procedure associated with QKDN management in a SDN controller.

At step S210, a QKDN control layer management (QCLM) function included in a QKDN manager may determine a control action based on various factors.

For example, a control action determined in a QKDN manager may be determined based on one or more of QKDN failure information, performance information (e.g., performance degradation), charge information (e.g., charge policy), and diagnostic information.

At step S212, the QKDN manager may transmit information on the determined QKDN control action to the SDN controller.

For example, information on the QKDN control action may be transmitted to an N-th control entity among N SDN control entities included in a QKDN control layer. The example of FIG. 2 is described under the assumption that the N-th control entity forward the information on the QKDN control action to another control entity (e.g., a third control entity) (S214), but the present disclosure is not limited thereto, and processing of the QKDN control action, which is described below, may be performed directly by the N-th control entity.

For example, the N-th control entity may correspond to an upper control entity in a hierarchical structure relative to other control entities. For example, the N-th control entity may include a SDN controller control and management function.

In addition, among lower control entities, a third control entity may include a policy-based control function, a second control entity may include a routing control function, and a first control entity may include a session control function. However, the scope of the present disclosure is not limited thereto. As described above, N control entities may be distinguished by resource groups (e.g., target, region, subnetwork, function) controlled by each of the entities and may have an upper-lower relation in a hierarchical structure.

At step S220, the third control entity may determine whether or not a QKDN control action is associated with a KM. For example, a KM-related action may include a key relay routing/rerouting control action.

When the QKDN control action is a KM-related action (Yes of S220), a routing/rerouting control action may be performed. For example, based on a type of QKD control action, route/reroute information (or path information) may be produced in the second control entity (S222), the produced route/reroute information may be forwarded to the KM layer (S224), and the KM layer may provision (that is, prepare or be ready for) a route/reroute path (S226) or perform key relay on a route/reroute path.

When the QKDN control action is not a KM-related action (No of S220), the third control entity may determine whether or not the QKDN control action is a QKD-related action (S230). For example, a QKD-related action may include a provisioning action, a protection/recovery action and the like.

When the QKDN control action is a QKD-related action (Yes of S230), the third control entity may request protocol and/or protection/recovery information, which is supported in QKD, to a QKDN manager (through the N-th control entity) (S232). In response to this, the QKDN manager may provide the protocol and/or protection/recovery information supported in QKD to the third control entity (through the N-th control entity) (S234).

At step S212 and step S214, when QKDN control action information includes the supported protocol and/or protection/recovery information, the step S232 and the step S234 may be skipped.

When the QKDN control action is a QKD-related action (Yes of S230) and is a provisioning-related action, a quantum channel protocol for interoperability is determined among supported protocols (S240) and QKD quantum channel protocol information is forwarded to a QKD module (S242) so that a QKD quantum channel provisioning procedure may be performed in the QKD module (S244).

When the QKDN control action is a QKD-related action (Yes of S230) and is a protection/recovery-related action, a protection/recovery policy is determined based on protection/recovery information (S250) and a QKD protection/recovery rule is forwarded to the QKD module (S252) so that a QKD protection quantum/classic channel may be set in the QKD module (S254).

When the QKDN control action is not a QKD-related action (No of S230), the third control entity may perform another control action including a charge action (S260).

As described above, for QKDN control actions associated with QKDN management, the SDN controller may sequentially classify control actions based on the type, attribute or target of the control actions and may perform a control action according to the control actions thus classified. Accordingly, for a control action associated with QKDN management, which is not a control action of the SDN controller alone, an efficient control action meeting the feature of the control action may be performed. In addition, for a control action associated with QKDN management, the SDN controller may orchestrate efficiently a plurality of SDN control entities.

Figure 3:
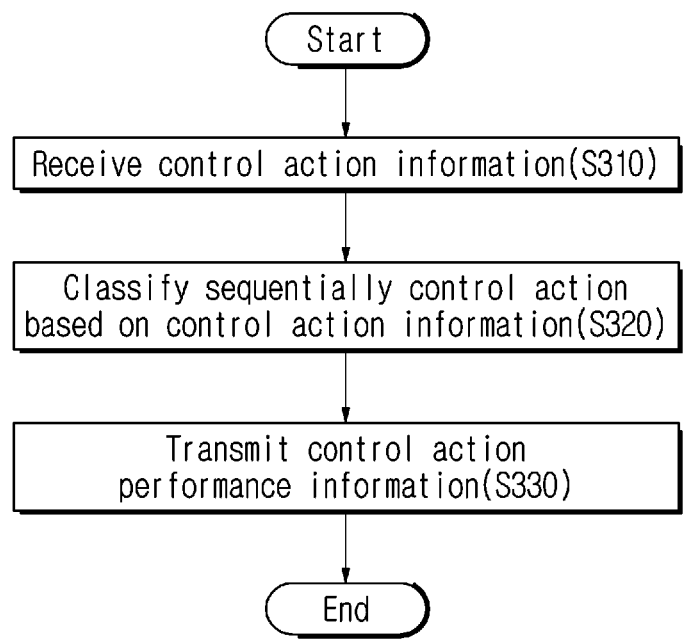
FIG. 3 is a view for explaining a control action procedure of a SDN controller according to an embodiment of the present disclosure.

FIG. 3 is a view for explaining a control action procedure of a SDN controller according to an embodiment of the present disclosure.

Each step of the example method of FIG. 3 is described to be performed by a SDN controller but, when a QKDN control layer includes a plurality of SDN control entities, may be performed by one or more of the plurality of SDN control entities. For example, the example method of FIG. 3 may be performed by an upper control entity among the plurality of SDN control entities having a hierarchical structure.

At step S310, the SDN controller may receive control action information from a QKDN manager.

The control action information may be determined by the QKDN manager (or QCLM function) based on one or more of QKDN failure information, performance information and charge information, and the determined control action information may be provided from the QKDN manager to the SDN controller.

At step S320, the SDN controller may sequentially classify a control action based on the control action information.

For example, a control action may be classified as one of a routing or rerouting-related control action, a provisioning-related control action, a protection or recovery-related control action and a charge-related (or another) control action. In addition, a control action may be classified preferentially based on whether or not it is associated with routing or rerouting and sequentially whether or not it is associated with provisioning, whether or not it is associated with protection or recovery, and whether or not it is associated with charge (or another control action).

At step S330, the SDN controller may transmit control action performance information to a target associated with a corresponding control action.

For example, when a control action is classified as a routing or rerouting-related control action in the first control entity, routing or rerouting information may be produced by the first control entity or the second control entity. As a target associated with a routing or rerouting action is a key management (KM) layer, the produced routing or rerouting information may be transmitted from the first control entity or the second control entity to the KM layer.

Next, when a control action is classified not as a routing or rerouting-related control action but as a provisioning-related control action in the first control entity, provisioning information may be determined by the first control entity or the second control entity. As a target associated with a provisioning action is a quantum key distribution (QKD) module, the determined provisioning information may be transmitted from the first control entity or the second control entity to the QKD module.

Next, when a control action is classified not as a routing or rerouting-related control action and a provisioning-related control action but as a protection or recovery-related control action in the first control entity, a protection or recovery policy may be determined by the first control entity or the second control entity. As a target associated with a protection or recovery action is a QKD module, the protection or recovery rule may be transmitted from the first control entity or the second control entity to the QKD module. Accordingly, a QKD protection quantum channel or classic channel may be set in the QKD module based on the protection or recovery rule.

Next, when a control action is classified not as a routing or rerouting-related control action, a provisioning-related control action and a protection or recovery-related control action but as a charge-related or another control action in the first control entity, the charge-related control action may be performed by the first control entity or the second control entity. The first control entity or the second control entity may transmit information for performing a charge-related or another control action to a target (e.g., service layer, QKDN management layer) associated with the charge-related or another control action.

Figure 4:
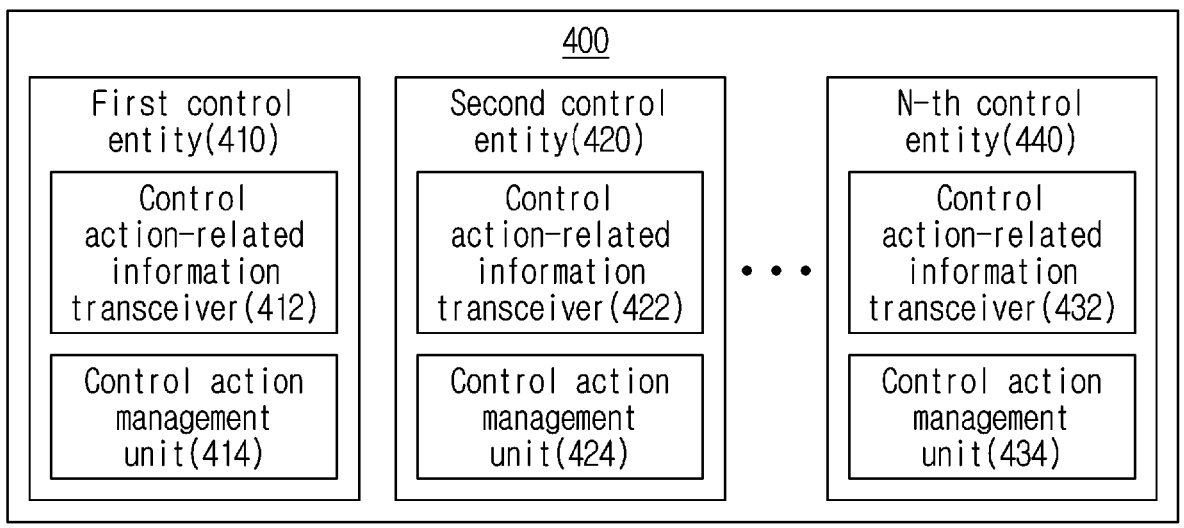
FIG. 4 is a view for explaining a structure of a QKDN control layer according to an embodiment of the present disclosure.

FIG. 4 is a view for explaining a structure of a QKDN control layer according to an embodiment of the present disclosure.

A QKDN control layer 400 may include N SDN control entities 410, 420, . . . , 430. The respective control entities 410, 420 and 430 may include control action-related information transceivers 412, 422 and 432 and control action management units 414, 424 and 434 respectively.

The control action-related information transceiver 412 of the first control entity 410 may receive control action information from a QKDN manager (or QCLM function) and transmit control action performance information for a target associated with a control action which is classified by the control action management unit 414.

The control action management unit 414 of the first control entity 410 may sequentially classify a control action based on control action information which is forwarded from the control action-related information transceiver 412.

For example, a control action may be classified as one of a routing or rerouting-related control action, a provisioning-related control action, a protection or recovery-related control action and a charge-related (or another) control action. In addition, a control action may be classified preferentially based on whether or not it is associated with routing or rerouting and sequentially whether or not it is associated with provisioning, whether or not it is associated with protection or recovery, and whether or not it is associated with charge (or another control action).

As the second control entity 420 and the N-th control entity 430 are capable of operating in a similar wary to the first control entity 410, the duplicate explanation will be skipped.

As the detailed operation of N SDN control entities 400, 410, . . . 430 of the QKDN control layer 400 is the same as what is described above, the duplicate explanation will be skipped.

The various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays A general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer. A command, which is available to program a processing system for implementing a feature described in the present disclosure, may be stored in a storage medium or in a computer-readable storage medium, and a feature described in the present disclosure may be implemented by using a computer program product including such a storage medium. A storage medium may include a high-speed random-access memory like DRAM, SRAM, DDR RAM or any other random-access solid-state memory device but is not limited thereto and may include one or more magnetic disk storage devices, an optical disk storage device, a flash memory device or a non-volatile memory like a non-volatile solid state storage device. A memory includes selectively one or more storage devices located remotely from a processor or processors. A memory or a non-volatile memory device(s) within the memory includes a non-transitory computable-readable storage medium. A feature described in the present disclosure may be stored in any one of machine-readable media to control the hardware of a processing system, and the processing system may be integrated with software and/or firmware configured to interact with another mechanism utilizing a result of an embodiment of the present disclosure. Such software or firmware may include an application code, a device driver, an operating system and an execution environment/container but is not limited thereto.

What is claimed is:

1. A method for performing a control action associated with quantum key distribution network (QKDN) management in a QKDN, the method comprising:
    receiving, by a first control entity, control action information from a QKDN manager, wherein the control action information is determined by the QKDN manager based on at least one of QKDN failure information, performance degradation, or charging policy;
    classifying, by the first control entity, a control action corresponding to the control action information sequentially as one of a routing or rerouting-related control action, a provisioning-related control action, a protection or recovery-related control action, and a charge-related control action based on the control action information; and
    transmitting, by the first control entity, information for performing the classified control action for a target associated with the classified control action;
    wherein the first control entity is an upper control entity in a hierarchical structure of a software-defined networking (SDN) controller configured to control a plurality of control entities,
    wherein the first control entity comprises an SDN controller control and management function controlled by the SDN controller, wherein the SDN controller control and management function controlled by the SDN controller is configured to:
    receive the control action information from the QKDN manager, and
    transmit information for performing the control action for the target associated with the classified control action,
    wherein, when the control action is a routing or rerouting-related control action, routing or rerouting information is produced by the first control entity or a second control entity, and
    wherein the produced routing and rerouting information is forwarded to a key management (KM) layer.

2. The method of claim 1, wherein, when the control action is not a routing or rerouting-related control action but a provisioning-related control action, provisioning information, which is determined by the first control entity or the second control entity, is forwarded to a quantum key distribution (QKD) module.

3. The method of claim 2, wherein, when the control action is not a routing or rerouting-related control action and not a provisioning-related control action but a protection or recovery-related control action, a protection or recovery policy is determined by the first control entity or the second control entity, and
    wherein a protection or recovery rule is forwarded to the QKD module.

4. The method of claim 3, wherein a QKD protection quantum channel or classic channel is set in the QKD module based on the protection or recovery rule.

5. The method of claim 3, wherein, when the control action is not a routing or rerouting-related control action, not a provisioning-related control action and not a protection or recovery-related control action but a charge-related control action, the charge-related control action is performed by the first control entity or the second control entity.

6. The method of claim 1, wherein the control action information is determined based on one or more of QKDN failure information, performance information and charge information.

7. The method of claim 1, wherein the plurality of control entities comprises the first control entity associated with a first resource group and the second control entity associated with a second resource group.

8. The method of claim 7, wherein the first resource group or the second resource group is defined based on one or more of target, region, subnetwork and function.

9. The method of claim 1, wherein the QKDN comprises a quantum layer, a KM layer, a QKDN control layer, a QKDN management layer and a service layer,
    wherein the QKDN control layer comprises the plurality of control entities, and
    wherein the QKDN management layer comprises the QKDN manager or a QKDN control layer management (QCLM) function.

10. A controller for performing a control action associated with quantum key distribution network (QKDN) management in a QKDN, the controller comprising a processor and a memory configured to implement:
- a software-defined networking (SDN) controller configured to control N control entities (N is an integer equal to or greater than 1),
- wherein a first control entity of the N control entities comprises:
- a software-defined networking (SDN) controller control and management function configured to receive control action information from a QKDN manager, wherein the control action information is determined by the QKDN manager based on at least one of QKDN failure information, performance degradation, or charging policy; and
- a control action management unit configured to classify, based on the control action information, a control action corresponding to the control action information sequentially as one of a routing or rerouting-related control action, a provisioning-related control action, a protection or recovery-related control action and a charge-related control action,
- wherein, for a target associated with the control action classified by the control action management unit, the SDN controller control and management function is set to transmit information for performing the control action;
- wherein the first control entity is an upper control entity in a hierarchical structure of a plurality of control entities, which comprises the SDN controller,
- wherein, when the control action is a routing or rerouting-related control action, routing or rerouting information is produced by the first control entity or a second control entity, and
- wherein the produced routing and rerouting information is forwarded to a key management (KM) layer.

* * * * *